March 11, 1924. 1,486,494
G. OLLERT
SLIDING WEIGHT SCALE
Filed May 31, 1921 2 Sheets-Sheet 1
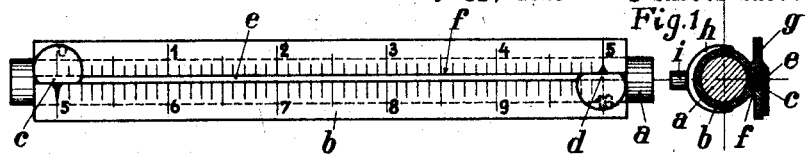
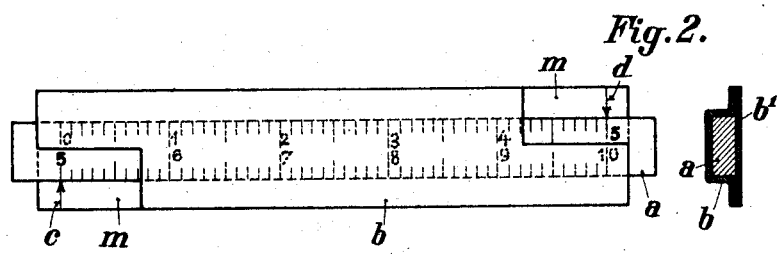
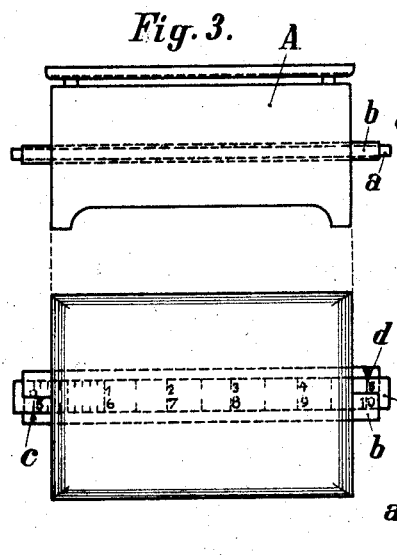
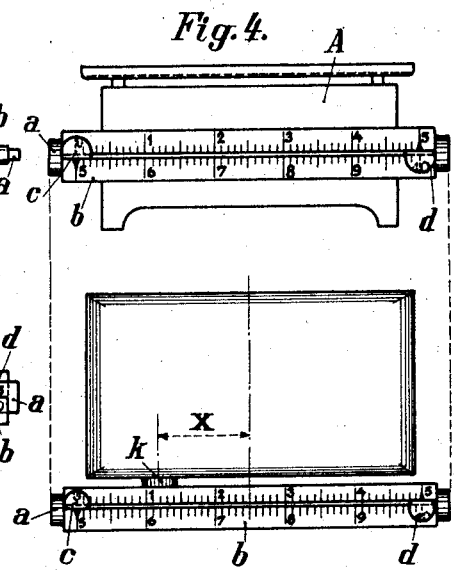
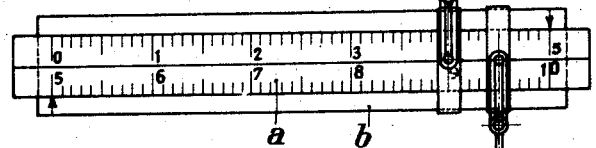
Inventor:

March 11, 1924.
G. OLLERT
1,486,494
SLIDING WEIGHT SCALE
Filed May 31, 1921  2 Sheets-Sheet 2
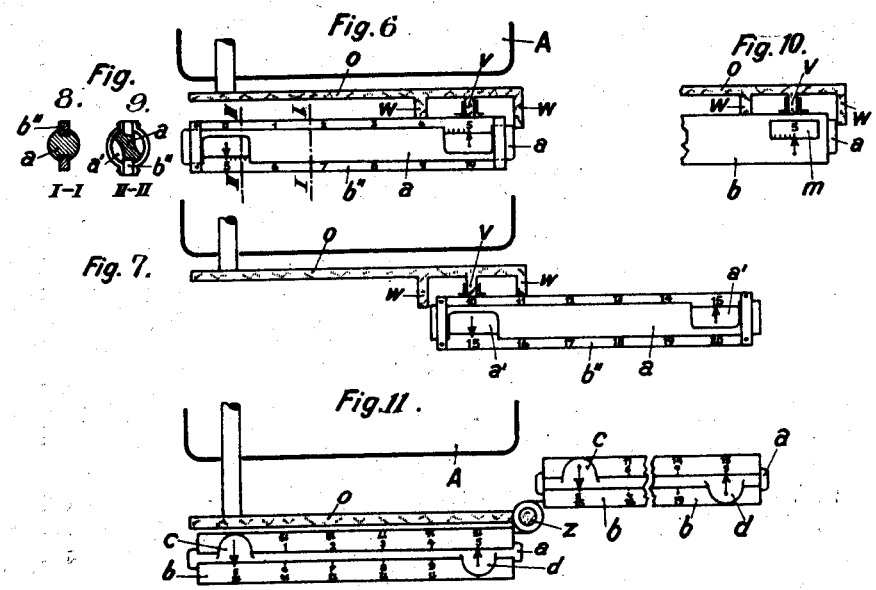

Patented Mar. 11, 1924.

1,486,494

UNITED STATES PATENT OFFICE.

GEORG OLLERT, OF BERLIN-NEUKOLLN, GERMANY.

SLIDING-WEIGHT SCALE.

Application filed May 31, 1921. Serial No. 473,981.

*To all whom it may concern:*

Be it known that I, GEORG OLLERT, a citizen of the German Republic, residing at Berlin-Neukolln, Germany, have invented certain new and useful Improvements in Sliding-Weight Scales, of which the following is a specification.

This invention relates to sliding weight scales having a sliding weight of peculiar rod-shape. In accordance with the present invention this sliding weight is mounted in a guide bar of suitable construction, in such a manner that it may be shifted to one side or to the other and that, when being shifted to the one side one of the two index-pointers provided at the ends of the sliding weight is moving over the corresponding graduation, the other index pointer moving over the other graduation when the weight is being moved to the other side. The index pointers are suitably shaped so as to cover up the graduation marks which are not to be indicated by them. A further construction of the invention consists in making the guide bar adjustable with regard to the scale beam, whereby the weighing range of the scales is further enlarged.

This type of construction is particularly suited to table- or platform-scales with a top scale pan. As compared to scales of types hitherto known and of equal size, it offers the advantage of providing a measuring range twice as great, whilst a sliding weight of half the usual weight only is required.

In the drawing attached to this specification and forming part thereof, several modifications of the invention are represented by way of example, embodying the principle of this invention. In the drawing:—

Fig. 1 is a front view and a cross section of one form of construction.

Fig. 2 is a front view and a cross section of a second form of construction.

Fig. 3 shows the arrangement of a weighing device according to Fig. 2 in combination with a platform scale, the upper figure being a side view and the lower figure being a plan view of the same.

Fig. 4 shows the arrangement of a weighing device according to Fig. 1 in combination with a platform scale, the upper figure being a side view and the lower figure being a plan view of the same.

Fig. 5 discloses a Roman balance fitted with the new weighing device.

Figs. 6 to 11 show further forms of construction of weighing devices in which the guide bar is adjustable with regard to the scale beam.

Referring to the drawings, the new device consists principally of a rod-shaped sliding weight $a$, moving in a guide bar $b$ of about the same length, from which the sliding weight may be drawn out to the one or to the other side. The sliding rod $a$ or the guide bar $b$ is provided with two graduations, one above the other both counting in the same sense. The upper graduation for instance counts from 0–5 the lower one from 5 to 10 units. At the ends of the guide bar $b$ or, in the second case, at the ends of the sliding rod $a$ two indexes $c$ and $d$ are provided, index $d$ indicating on the upper graduation, index $c$ on the lower graduation. The two fundamental arrangements possible, represented in Figs. 1 and 2 are constructed as weighing rules of a peculiar type.

In the form of construction shown by Fig. 1 the sliding weight $a$ is a rod of round section and slides in the tubular guide $b$ which is provided with a longitudinal slot $f$ and two flanges $g$, the latter being graduated in the manner above indicated. The weighing rod $a$ is provided with a projecting fillet $e$, which engages in the slot $f$ and carries the two indexes $c$ and $d$, one at each end. If the weighing rod is in its normal position the pointers of indexes $c$ and $d$ both indicate 5. The two indexes, on the side away from the pointer, have the form of a shield, which covers, to a certain extent, the graduation not pertaining to the respective index. If the weighing rod $a$ is shifted to the left hand side, the index $d$ at the right hand side moves over the upper graduation from 0 to 5, its shield at the same time covering the figures of the lower graduation. If the weighing rod is shifted to the right hand side, the index $c$ at the left hand side moves over the lower graduation from 5 to 10, its shield at the same time covering the figures of the upper graduation.

The face of the graduation may also be placed in a slanting position, so as to make the reading more convenient. For this purpose the tube $b$ is placed into a clutch $h$, where it may be turned into a suitable position. The reading is confined to a comparatively limited space. If rod $a$ be replaced by a tube of $\tfrac{1}{10}$ of the weight of the rod, it will be possible, practically without any additional expenses, to construct scales on which smaller loads can be read with ten-fold accuracy. The graduated weighing device above described may be fixed to one of the scale-beams at any distance $x$ from the center-plane of the scales A, e. g. by making the pin $i$ of the clutch $h$ engage in a projection $k$ of the scale-beam. The adjustable arrangement in clutch $i$ also permits an easy adjustment of the weighing device in combination with the scales. As shown by Fig. 4 the arrangement is suitable for any type of platform scales with external scale-beam.

In the modification according to Fig. 2 the double graduation is not placed on the guide $b$, but on the sliding rod $a$, and both parts, the guide and the rod, are prisms of rectangular section. The guide $b$ consists generally in a moulded piece, to which is fixed a cover $b'$ having apertures $m$ at both ends. Through these apertures only the figures indicating the weight ascertained by the scales are visible opposite to the index $c$ or $d$, so that mistakes in reading are impossible. This arrangement is of simple design and of restricted height, and besides, offers the advantage that the reverse side of the sliding weight prism $a$ may be graduated to show, e. g., the units of weight of another country. By simply turning over the prisms the scale may be adapted for use in another country. Several prisms with different graduations may be provided for each scale. It is also possible to increase the measuring range by supplying hollow weighing rods, as above mentioned.

A principal advantage of this arrangement is that the reading is always done at one end of the guide. For this reason it is possible to arrange the prism entirely within the box-shaped scales and to construct the entire scales symmetrical as represented in Fig. 3. In this it is assumed that the weighing prism is inserted into a slot in the scale beam below the scale-pan. Hereby the scales of this type are made much cheaper and more accurate and compact, so that their reading accuracy equals that of other scales of twice the dimensions.

A heavy counterweight is required for the weighing beam of scales constructed on the principle of the Roman balance. This drawback is eliminated by applying to such scales the modification of this invention disclosed in Fig. 5, as the weighing prism $a$, when near the zero position, projects from the guiding prism $b$ to the other side and therefore acts as a counterweight. Such scales are therefore of less weight and more convenient in use, their length overall being only half of that of other types hitherto known.

In the weighing device which has been described above the guide bar $b$ for the rod-shaped sliding weight $a$ is fixed as regards the scale beam. When the guide bar is however made adjustable with regard to the scale beam, the length of the graduations or the weighing range of the scale can be multiplied by a corresponding construction of the guide bar.

To enlarge the weighing range the guide bar may be made adjustable with regard to the scale beam. This construction is shown in Figures 6 to 9.

In this case the guide is shaped like a frame $b''$ which carries the graduations on both sides, above and below. The sliding weight $a$ is guided by grooves between the arms of the frame $b''$ (Fig. 17) and it has indentations $a'$ at the ends (Fig. 15) and (Fig. 18) through which the graduations are visible. The frame $b''$ is pivotally mounted upon an axle $v$ fixed to the scale beam $o$, abutments $w$ serving for maintaining the same in the horizontal position. In the position shown by Fig. 15 the front side graduation can be read, the rear side graduation being readable at the position shown by Fig. 16. The pivot $v$ can be situated at any point, e. g., in the center plane of the scale A if a very compact construction is desired.

Fig. 10 shows how a tubular guide is mounted in a similar manner as has been just described.

In the form of construction shown by Fig. 11 the guide $b$ is mounted on the scale beam $o$ so that it can oscillate around a perpendicular axle $z$. Each graduation comprises two ranges of figures, the figures of one range being turned upside down, so that the device can be used for the fourfold weighing range.

I claim:—

1. An improved sliding weight for scales comprising in combination with the scale beam, a guiding device on the weight beam, a rod-shaped sliding weight movably mounted in said guide, so that it can be shifted to either side, one of these parts (guiding device and rod-shaped sliding weight having a double graduation thereon), and markers upon the other of these parts for indicating the position of the sliding weight.

2. An improved sliding weight for scales comprising in combination a tubular guide slotted in longitudinal direction, marked with graduations and adjustably and revolubly mounted at a convenient point, a rod shaped sliding weight of circular cross section movably mounted in said tubular guide, index pointers fixed one at each end of said rod shaped sliding weight and projecting through the slot of said tube so that they can play over the corresponding graduation when the sliding weight is being shifted, and shield like extensions at the fixed ends of said index pointers covering the graduation which does not belong to the pointer.

3. An improved sliding weight for scales comprising in combination with the scale beam, a fixed pivot upon said scale beam, a case like frame shaped guide mounted upon said pivot so that it can be oscillated through 180° marked with two graduations each upon the front face and upon the rear face and having guide grooves, a rod shaped sliding weight in said grooves of the frame shaped guide which partly covers said graduations and index pointers fixed at either end of said rod shaped sliding weight designed to play over the visible parts of said graduations.

4. An improved sliding weight for scales comprising in combination with the scale beam, a vertical axle fixed upon said scale beam, a guide bar marked with two graduations being each composed of two ranges of figures hinged upon said vertical axle so that it can be turned for 180°, a rod shaped sliding weight movably mounted in said guide, and two indexes fixed in said rod shaped sliding weight one at each end.

In testimony whereof I affix my signature in presence of two witnesses.

GEORG OLLERT.

Witnesses:
KARL WALTHER,
FERD BUTTIGER.